US008326686B2

(12) United States Patent
Datar et al.

(10) Patent No.: US 8,326,686 B2
(45) Date of Patent: Dec. 4, 2012

(54) AUTOMATICALLY GENERATING ADS AND AD-SERVING INDEX

(75) Inventors: Mayur Datar, Santa Clara, CA (US); Ashutosh Garg, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 1602 days.

(21) Appl. No.: 11/394,135

(22) Filed: Mar. 30, 2006

(65) Prior Publication Data

US 2007/0239530 A1  Oct. 11, 2007

(51) Int. Cl.
*G06Q 30/00* (2012.01)
(52) U.S. Cl. .................................. 705/14.49; 705/14.73
(58) Field of Classification Search .......................... None
See application file for complete search history.

(56) References Cited

U.S. PATENT DOCUMENTS

| | | | |
|---|---|---|---|
| 5,724,521 A | 3/1998 | Dedrick | |
| 5,740,549 A | 4/1998 | Reilly et al. | |
| 5,848,397 A | 12/1998 | Marsh et al. | |
| 5,948,061 A * | 9/1999 | Merriman et al. | 709/219 |
| 6,026,368 A | 2/2000 | Brown et al. | |
| 6,044,376 A | 3/2000 | Kurtzman, II | |
| 6,078,914 A | 6/2000 | Redfern | |
| 6,144,944 A | 11/2000 | Kurtzman, II et al. | |
| 6,167,382 A | 12/2000 | Sparks et al. | |
| 6,269,361 B1 | 7/2001 | Davis et al. | |
| 6,401,075 B1 | 6/2002 | Mason et al. | |
| 6,985,882 B1 | 1/2006 | Del Sesto | |
| 7,039,599 B2 | 5/2006 | Merriman | |
| 7,136,875 B2 | 11/2006 | Anderson et al. | |
| 2004/0093327 A1 * | 5/2004 | Anderson et al. | 707/3 |
| 2004/0143600 A1 * | 7/2004 | Musgrove et al. | 707/104.1 |

FOREIGN PATENT DOCUMENTS

WO  WO 97/21183  6/1997

OTHER PUBLICATIONS

PCT/ISA/220, "Notification of Transmittal of the International Search Report and the Written Opinion of the International Searching Authority, or the Declaration" for PCT/US07/07367, mailed Sep. 17, 2007 (1 pg.).
PCT/ISA/210, "International Search Report" for PCT/US07/07367, mailed Sep. 17, 2007 (2 pgs.).
PCT/ISA/237, "Written Opinion of the International Searching Authority" for PCT/US07/07367, mailed Sep. 17, 2007 (5 pgs.).
U.S. Appl. No. 95/001,073, Reexamination of Stone et al.
U.S. Appl. No. 95/001,061, Reexamination of Stone et al.
U.S. Appl. No. 95/001,069, Reexamination of Stone et al.

(Continued)

*Primary Examiner* — Daniel Sorkowitz
(74) *Attorney, Agent, or Firm* — John C. Pokotylo; Straub & Pokotylo

(57) ABSTRACT

Advertiser repository information (e.g., a list of HTML pages) may be used to automatically generate a page-ad and associated ad information for each page using a subset of features of the page. Subsequently, a page-ad index for all pages from different advertisers may be created. After creating a page-ad index, if a client issues a query (e.g., from a search engine), candidate page-ads may be selected using the page-ads index. If necessary (e.g., if there are more candidate page-ads than requested ads), the candidate page-ads may be entered into an arbitration (e.g., auction). Then, the arbitration may determine a set of one or more winning page-ads to be served for rendering.

26 Claims, 9 Drawing Sheets

OTHER PUBLICATIONS

U.S. Appl. No. 95/001,068, Reexamination of Stone et al.
Dedrick, R., Interactive Electronic Advertising, IEEE, 1994.
Dedrick, R., A Consumption Model for Targeted Electronic Advertising, Intel Architecture Labs, IEEE, 1995.
Baseview Products, Inc., ClassManagerPro Administration Manual v. 1.0.5, Feb. 1, 1997.
Ad-Star.com website archive from www. Archive.org, Apr. 12, 1997 and Feb 1, 1997.
Information Access Technologies, Inc., Aaddzz brochure, "The Best Way to Buy and Sell Web Advertising Space," © 1997.
Information Access Technologies, Inc., Aaddzz.com website archive from www. Archive.org, archived on Jan. 30, 1998.
AdKnowledge Market Match Planner: Reviewer's Guide, AdKnowledge, May 1998.
AdKnowledge Campaign Manager: Reviewer's Guide, AdKnowledge, Aug. 1998.
Baseview Products, Inc., AdManagerPro Administration Manual v. 2.0, Dec. 1998.
AdForce, Inc., A Complete Guide to AdForce, Version 2.6, 1998.
AdForce, Inc., S-1/A SEC Filing, May 6, 1999.
Business Wire, "Global Network, Inc. Enters Into Agreement in Principle With Major Advertising Agency," Oct. 4, 1999.
Zeff, R. et al., *Advertising on the Internet*, $2^{nd}$ Ed., John Wiley & Sons, 1999.
Request for Reexamination of U.S. Patent No. 7,240,025 B2, Control No. 95/001,073.
Request for Reexamination of U.S. Patent No. 6,446,045 B1, Control No. 95/001,061.
Request for Reexamination of U.S. Patent No. 7,249,059 B2, Control No. 95/001,069.
Request for Reexamination of U.S. Patent No. 6,829,587 B2, Control No. 95/001,068.

* cited by examiner

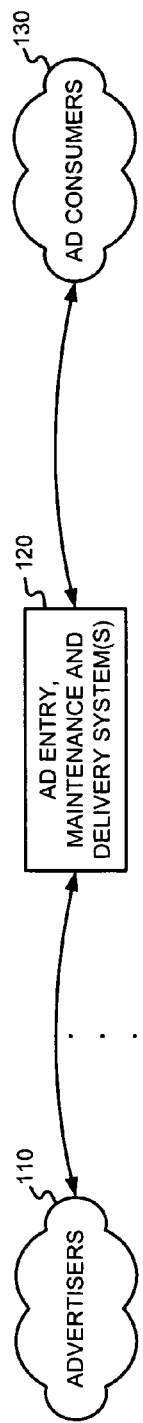
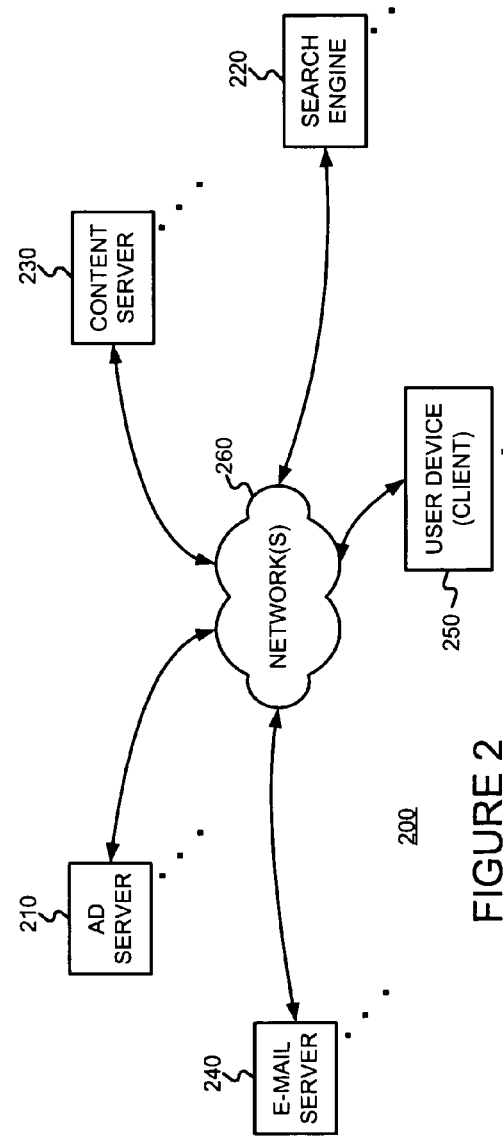

AUTOMATICALLY GENERATING ADS AND AD-SERVING INDEX

§1. BACKGROUND OF THE INVENTION

§1.1 Field of the Invention

The present invention concerns advertising, such as online advertising for example. In particular, the present invention concerns helping to automatically generate advertisements ("ads") for Web pages selling products or services, along with an inverted index used to target the serving of these ads, using hypertext content and/or other attributes of the underlying product or service.

§1.2 Background Information

Internet search engines, such as Google for example, support keyword-based online advertising. To advertise on these search engines an advertiser has to provide an ad creative (what is actually rendered or displayed) for their ad, as well as a set of targeting keywords for the ad.

Creating the ad creative and choosing the right set of targeting keywords that will give the maximum return on investment for an advertising budget can be a time consuming process. This is particularly true for e-retailers that have a large number of product offerings, especially if such product offerings fall under different product categories. Consider, for example, businesses like Amazon, and Wal-Mart that might want to use online advertising. Such businesses can have an inventory of tens of thousands to millions of products or services (hereafter referred to in the specification as "products" without loss of generality) Because of the underlying efforts and money required, it is daunting for these types of businesses to manually create an advertisement, including an ad creative and a set of targeting keywords, for each of the products sold on their Websites. Consequently, businesses will often create a single advertisement or a small set of advertisements for their entire inventory. For example, an online book seller may create a general ad like "Cheap books for sale" and target it with general keywords like "books," "online," "cheap", where the general ad is meant to serve the bookseller's entire inventory. Such an advertisement is not well-targeted for search phrases. For example, if a search engine user searches on phrases like "lord of the rings" or "dan brown," the forgoing general advertisement above is not targeted to such popular book titles and authors—even though the bookseller may carry inventory related to these keywords. Even if a general ad creative is targeted to various products, it might not perform as well as a more specific ad creative.

As can be appreciated from the foregoing example, it would be very useful to help businesses, and especially business selling a large number of different products, to advertise online effectively, while allowing such businesses to avoid tedious and laborious ad creative authoring and targeting tasks.

So-called "templated ads" may be used to help advertisers create multiple, but similar, ads with minimal effort. Using templated ads technology, an advertiser supplies a template that contains certain variables as an ad creative. For ease of exposition assume that there is only one variable in the template. This variable is substituted by a keyword to form an instance of the template. Having created the template, the advertiser simply supplies a list of keywords to create multiple instances of this template. For example, a template may look like "Cheap deal on <<bookname>>" where <<bookname>> is a variable that can take any book name. However, templated ads may not generate good quality ads for every product in the inventory. Moreover, they do not solve the problem of generating targeting keywords for the ads.

As can be appreciated, better techniques for helping businesses to advertise online effectively, while allowing such businesses to avoid tedious and laborious ad creative authoring and targeting tasks, would be useful.

§2. SUMMARY OF THE INVENTION

Embodiments consistent with the present invention may accept advertiser repository information (e.g., a list of HTML pages) and automatically generate a page-ad and associated ad information for each page using a subset of features of the page. Subsequently, a page-ad index for all pages from different advertisers may be created. After creating a page-ad index, if a client issues a query (e.g., from a search engine), embodiments consistent with the present invention may select candidate page-ads using the page-ads index. If necessary (e.g., if there are more candidate page-ads than requested ads), the candidate page-ads may be entered into an arbitration (e.g., auction). Then, the arbitration may determine a set of one or more winning page-ads to be served for rendering.

In at least some embodiments consistent with the present invention, advertiser repository information may be a copy of the advertiser's inventory in hypertext format of products and/or services offered on their online Website. The inventory could be a collection of pages in HTML, XML, pdf or other "index-able" format. This inventory may be used to automatically generate an ad creative and associated page-ad information. Such generation of an ad creative and associated page-ad information may be performed for each Web page (perhaps selected by, or not excluded by an advertiser) of the collection that corresponds to a product or service. Thus, an ad creative and associated page-ad information may be generated for every page obtained from the repository.

In at least some embodiments consistent with the present invention, the ad creative and associated page-ad information may be generated using a subset of features present within the pages. These features may include one or more of the following: the amount of money the advertiser is willing to spend on ads for a specific product or category of products, for every page a maximum cost per click (cpc) if the page is the landing page of the page-ad, additional keywords corresponding to this page, that the advertiser may not want displayed when the page is rendered using a browser or any other application, etc.

At least some embodiments consistent with the present invention may create and store a page-ad index using information from all the pages from different advertisers. This may be done by generating a first index mapping a page to terms (e.g., words, phrases, and/or n-grams, etc.) extracted from the page. The terms may be weighted. The first index may then be processed to generate an inverted index (referred to as a "page-ad index") mapping terms to pages (or "page-ads" associated with such pages), which may be weighted. Therefore, the page-ad index may contain information about a number of pages (e.g., an associated page-ad identifier) from different advertisers.

In at least some embodiments consistent with the present invention, when a search query is received, the page-ads index may be used to determine page-ads corresponding to pages that may include the terms from the search query. Page-ads that include matching keywords or phrases may be considered as candidate page-ads and, if necessary entered into an arbitration (e.g., an auction) to determine a set of one or more winning page-ads. Candidate page-ads may have associated ad information (e.g., max offer per click, estimated click-through rate for the page-ad, budget constraints, etc.). Such parameters may be considered when selecting the winning ads. Types of ads other than page-ad may compete with page ads in the arbitration, or in a subsequent arbitration.

§3. BRIEF DESCRIPTION OF THE DRAWINGS

FIG. 1 is a diagram showing parties or entities that can interact with an advertising system.

FIG. 2 is a diagram illustrating an exemplary environment in which, or with which, embodiments consistent with the present invention may operate.

§4. DETAILED DESCRIPTION

Figure 3:
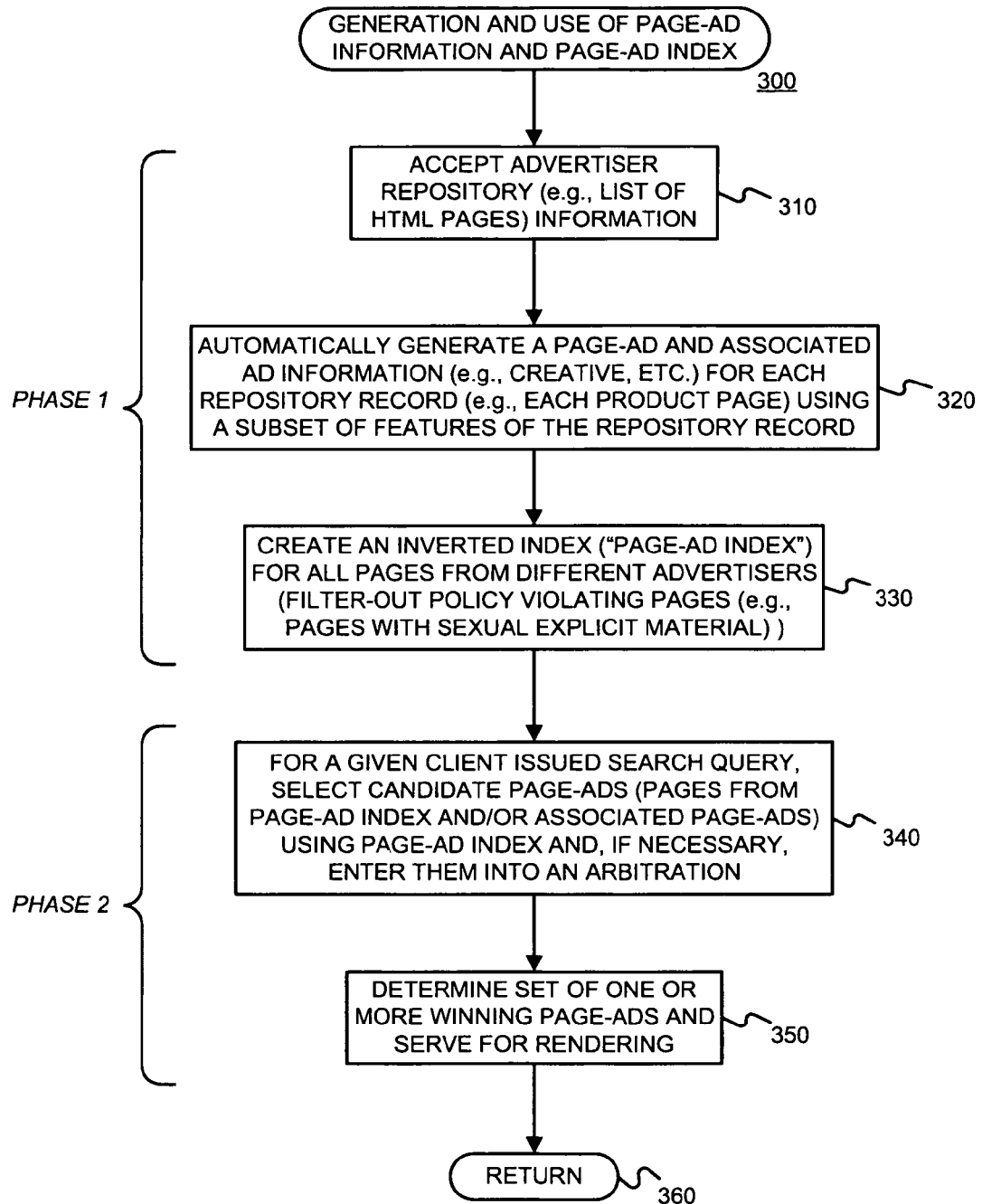
FIG. 3 is a flow diagram of an exemplary method for generating and using page-ad information and a page-ad index in a manner consistent with the present invention.

The present invention may involve novel methods, apparatus, message formats, and/or data structures for helping to automatically generate advertisements for Web pages along with an inverted index for targeting these advertisements based on hypertext content and other attributes of the underlying product or service. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

In the following definitions of terms that may be used in the specification are provided in §4.1. Then, environments in which, or with which, the present invention may operate are described in §4.2. Exemplary embodiments of the present invention are described in §4.3. Thereafter, specific examples illustrating the utility of exemplary embodiments of the present invention are provided in §4.4. Finally, some conclusions regarding the present invention are set forth in §4.5.

§4.1 DEFINITIONS

Online ads, such as those used in the exemplary systems described below with reference to FIGS. 1 and 2, or any other system, may have various intrinsic features. Such features may be specified by an application and/or an advertiser. These features are referred to as "ad features" below. For example, in the case of a text ad, ad features may include a title line, ad text, and an embedded link. In the case of an image ad, ad features may include images, executable code, and an embedded link. In the case of an audio ad, ad features may include audio content. The ad features may also include executable code (e.g., encoded as tones, provided in non-audio packets of an audio stream, etc.). Depending on the type of online ad, ad features may include one or more of the following: text, a link, an audio file, a video file, an image file, executable code, embedded information, etc. In devices that can render more than one type of media (devices that have different outputs), some ad features may pertain to one type of media rendered to the user over one output, while other ad features may pertain to another type of media rendered to the user over another output. For example, if an MP3 player includes a display, an ad to be rendered on such a player can have an audio component and/or a text component. As another example, if a mobile telephone includes a speaker, a display and telephony means, an ad to be rendered on such a telephone can have one or more of an audio component, a text component, an image component and executable code for dialing an encoded telephone number. Naturally, other types of ad features are possible.

When an online ad is served, one or more parameters may be used to describe how, when, and/or where the ad was served. These parameters are referred to as "serving parameters" below. Serving parameters may include, for example, one or more of the following: features of (including information on) a document on which, or with which, the ad was served, a search query or search results associated with the serving of the ad, a user characteristic (e.g., their geographic location, the language used by the user, the type of browser used, previous page views, previous behavior, user account, any Web cookies used by the system, user device characteristics, etc.), a host or affiliate site (e.g., America Online, Google, Yahoo) that initiated the request, an absolute position of the ad on the page on which it was served, an ad spot in which the ad was served (e.g., a position (spatial or temporal) of the ad relative to other ads served), an absolute size of the ad, a size of the ad relative to other ads, an absolute volume of the ad, a volume of the ad relative to other ads, an absolute temporal length of the ad, a relative temporal length of the ad, a color of the ad, a number of other ads served, types of other ads served, time of day served, time of week served, time of year served, etc. Naturally, there are other serving parameters that may be used in the context of the invention.

Although serving parameters may be extrinsic to ad features, they may be associated with an ad as serving conditions or constraints. When used as serving conditions or constraints, such serving parameters are referred to simply as "serving constraints" (or "targeting criteria"). For example, in some systems, an advertiser may be able to target the serving of its ad by specifying that it is only to be served on weekdays, no lower than a certain position, only to users in a certain location, etc. As another example, in some systems, an advertiser may specify that its ad is to be served only if a page or search query includes certain keywords or phrases. As yet another example, in some systems, an advertiser may specify that its ad is to be served only if a document, on which, or with which, the ad is to be served, includes certain topics or concepts, or falls under a particular cluster or clusters, or some other classification or classifications (e.g., verticals). In some systems, an advertiser may specify that its ad is to be served only to (or is not to be served to) user devices having certain characteristics. Finally, in some systems, an ad might be targeted so that it is served in response to a request sourced from a particular location, or in response to a request concerning a particular location.

"Ad information" may include any combination of ad features, ad serving constraints, information derivable from ad features or ad serving constraints (referred to as "ad derived information"), and/or information related to the ad (referred to as "ad related information"), as well as an extension of such information (e.g., information derived from ad related information).

The ratio of the number of selections (e.g., clickthroughs, dial-throughs, etc.) of an ad to the number of impressions of the ad (i.e., the number of times an ad is rendered) is defined as the "selection rate" (or "clickthrough rate" or "CTR") of the ad.

A "conversion" is said to occur when a user consummates a transaction related to a previously served ad. What constitutes a conversion may vary from case to case and can be determined in a variety of ways. For example, it may be the case that a conversion occurs when a user clicks on an ad, is referred to the advertiser's Web page, and consummates a purchase there before leaving that Web page. Alternatively, a conversion may be defined as a user being shown an ad, and making a purchase on the advertiser's Web page within a predetermined time (e.g., seven days). In yet another alternative, a conversion may be defined by an advertiser to be any measurable/observable user action such as, for example, downloading a white paper, navigating to at least a given depth of a Website, viewing at least a certain number of Web pages, spending at least a predetermined amount of time on a Website or Web page, registering on a Website, dialing a telephone number, sending a product or service inquiry, etc. Often, if user actions don't indicate a consummated purchase, they may indicate a sales lead, although user actions constituting a conversion are not limited to this. Indeed, many other definitions of what constitutes a conversion are possible.

The ratio of the number of conversions to the number of impressions of the ad (i.e., the number of times an ad is rendered) and the ratio of the number of conversions to the number of selections (or the number of some other earlier event) are both referred to as the "conversion rate" or "CR." The type of conversion rate will be apparent from the context in which it is used. If a conversion is defined to be able to occur within a predetermined time since the serving of an ad, one possible definition of the conversion rate might only consider ads that have been served more than the predetermined time in the past.

A "property" is something on which ads can be presented. A property may include online content (e.g., a Website, an MP3 audio program, a Webcast, a podcast, online games, etc.), offline content (e.g., a newspaper, a magazine, a theatrical production, a concert, a sports event, a radio broadcast, etc.), and/or offline objects (e.g., a billboard, a stadium score board, an outfield wall, the side of truck trailer, etc.). Properties with content (e.g., magazines, newspapers, Websites, email messages, audio programs, etc.) may be referred to as "media properties." Although properties may themselves be offline, pertinent information about a property (e.g., attribute (s), topic(s), concept(s), category(ies), keyword(s), relevancy information, type(s) of ads supported, etc.) may be available online. For example, an outdoor jazz music festival may have entered the topics "music" and "jazz", the location of the concerts, the time of the concerts, artists scheduled to appear at the festival, and types of available ad spots (e.g., spots in a printed program, spots on a stage, spots on seat backs, audio announcements of sponsors, etc.). An "audio property" is a property that can be heard.

A "document" is to be broadly interpreted to include any machine-readable and machine-storable work product. A document may be a file, a combination of files, one or more files with embedded links to other files, etc. The files may be of any type, such as text, audio, image, video, etc. Parts of a document to be rendered to an end user can be thought of as "content" of the document. A document may include "structured data" containing both content (words, pictures, sound, conversations, etc.) and some indication of the meaning of that content (for example, e-mail fields and associated data, HTML tags and associated data, embedded song title and artist information, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website, a Web page, a Webcast, etc.

"Document information" may include any information included in the document, information derivable from information included in the document (referred to as "document derived information"), and/or information related to the document (referred to as "document related information"), as well as an extensions of such information (e.g., information derived from related information). An example of document derived information is a classification based on textual or audio content of a document. Examples of document related information include document information from other documents with links to the instant document, as well as document information from other documents to which the instant document links.

Content from a document may be rendered on a "content rendering application or device". Examples of content rendering applications include an Internet browser (e.g., Explorer, Netscape, Opera, Firefox, etc.), a media player (e.g., an MP3 player, a streaming audio file player from Microsoft Corporation of Redmond, Wash., or from RealNetworks, Inc., of Seattle, Wash., etc.), a viewer (e.g., an Adobe Acrobat pdf reader), etc.

A "content owner" is a person or entity that has some property right in the content of a media property (e.g., document). A content owner may be an author of the content. In addition, or alternatively, a content owner may have rights to reproduce the content, rights to prepare derivative works of the content, rights to display or perform the content publicly, and/or other proscribed rights in the content. Although a content server might be a content owner in the content of the documents it serves, this is not necessary. A "Web publisher" is an example of a content owner.

"User information" may include user behavior information and/or user profile information.

"E-mail information" may include any information included in an e-mail (also referred to as "internal e-mail information"), information derivable from information included in the e-mail and/or information related to the e-mail, as well as extensions of such information (e.g., information derived from related information). An example of information derived from e-mail information is information extracted or otherwise derived from search results returned in response to a search query composed of terms extracted from an e-mail subject line. Examples of information related to e-mail information include e-mail information about one or more other e-mails sent by the same sender of a given e-mail, or user information about an e-mail recipient. Information derived from or related to e-mail information may be referred to as "external e-mail information."

§4.2 EXEMPLARY ADVERTISING ENVIRONMENT IN WHICH, OR WITH WHICH, EMBODIMENTS CONSISTENT WITH THE PRESENT INVENTION MAY OPERATION

FIG. 1 is a high level diagram of an advertising environment. The environment may include an ad entry, maintenance and delivery system (simply referred to as an ad server) 120. Advertisers 110 may directly, or indirectly, enter, maintain, and track ad information in the system 120. The ads may be in the form of graphical ads such as so-called banner ads, text only ads, image ads, audio ads, video ads, ads combining one of more of any of such components, etc. The ads may also include embedded information, such as a link, and/or machine executable instructions. Ad consumers 130 may submit requests for ads to, accept ads responsive to their request from, and provide usage information to, the system 120. An entity other than an ad consumer 130 may initiate a request for ads. Although not shown, other entities may provide usage information (e.g., whether or not a conversion or click-through related to the ad occurred) to the system 120. This usage information may include measured or observed user behavior related to ads that have been served.

The ad server 120 may be similar to the one described in FIG. 2 of U.S. patent application Ser. No. 10/375,900 (incorporated herein by reference), entitled "SERVING ADVERTISEMENTS BASED ON CONTENT," filed on Feb. 26, 2003 and listing Darrell Anderson, Paul Buchheit, Alex Carobus, Claire Cui, Jeffrey A. Dean, Georges R. Harik, Deepak Jindal, and Narayanan Shivakumar as inventors. An advertising program may include information concerning accounts, campaigns, creatives, targeting, etc. The term "account" relates to information for a given advertiser (e.g., a unique e-mail address, a password, billing information, etc.). A "campaign" or "ad campaign" refers to one or more groups of one or more advertisements, and may include a start date, an end date, budget information, geo-targeting information, syndication information, etc. For example, Honda may have one advertising campaign for its automotive line, and a separate advertising campaign for its motorcycle line. The campaign for its automotive line may have one or more ad groups, each containing one or more ads. Each ad group may include targeting information (e.g., a set of keywords, a set of one or more topics, geolocation information, user profile information, etc.), and price information (e.g., maximum cost (cost per click-though, cost per conversion, etc.)). Alternatively, or in addition, each ad group may include an average cost (e.g., average cost per click-through, average cost per conversion, etc.). Therefore, a single maximum cost and/or a single average cost may be associated with one or more keywords, and/or topics. As stated, each ad group may have one or more ads or "creatives" (That is, ad content that is ultimately rendered to an end user). Each ad may also include a link to a URL (e.g., a landing Web page, such as the home page of an advertiser, or a Web page associated with a particular product or server). Naturally, the ad information may include more or less information, and may be organized in a number of different ways. Indeed, embodiments consistent with the present invention may be used to automatically determine, and/or avoid the need for, various ad campaign information.

FIG. 2 illustrates an environment 200 in which the present invention may be used. A user device (also referred to as a "client" or "client device") 250 may include a browser facility (such as the Explorer browser from Microsoft, the Opera Web Browser from Opera Software of Norway, the Navigator browser from AOL/Time Warner, etc.), an e-mail facility (e.g., Outlook from Microsoft), etc. A search engine 220 may permit user devices 250 to search collections of documents (e.g., Web pages). A content server 210 may permit user devices 250 to access documents. An e-mail server (such as Hotmail from Microsoft Network, Yahoo Mail, etc.) 240 may be used to provide e-mail functionality to user devices 250. An ad server 210 may be used to serve ads to user devices 250. The ads may be served in association with search results provided by the search engine 220. However, content-relevant ads may be served in association with content provided by the content server 230, and/or e-mail supported by the e-mail server 240 and/or user device e-mail facilities.

As discussed in U.S. patent application Ser. No. 10/375, 900 (introduced above), ads may be targeted to documents served by content servers. Thus, one example of an ad consumer 130 is a general content server 230 that receives requests for documents (e.g., articles, discussion threads, music, video, graphics, search results, Web page listings, etc.), and retrieves the requested document in response to, or otherwise services, the request. The content server may submit a request for ads to the ad server 120/210. Such an ad request may include a number of ads desired. The ad request may also include document request information. This information may include the document itself (e.g., page), a category or topic corresponding to the content of the document or the document request (e.g., arts, business, computers, arts-movies, arts-music, etc.), part or all of the document request, content age, content type (e.g., text, graphics, video, audio, mixed media, etc.), geo-location information, document information, etc.

The content server 230 may combine the requested document with one or more of the advertisements provided by the ad server 120/210. This combined information including the document content and advertisement(s) is then forwarded towards the end user device 250 that requested the document, for presentation to the user. Finally, the content server 230 may transmit information about the ads and how, when, and/or where the ads are to be rendered (e.g., position, click-through or not, impression time, impression date, size, conversion or not, etc.) back to the ad server 120/210. Alternatively, or in addition, such information may be provided back to the ad server 120/210 by some other means.

Another example of an ad consumer 130 is the search engine 220. A search engine 220 may receive queries for search results. In response, the search engine may retrieve relevant search results (e.g., from an index of Web pages). An exemplary search engine is described in the article S. Brin and L. Page, "The Anatomy of a Large-Scale Hypertextual Search Engine," *Seventh International World Wide Web Conference*, Brisbane, Australia and in U.S. Pat. No. 6,285,999 (both incorporated herein by reference). Such search results may include, for example, lists of Web page titles, snippets of text extracted from those Web pages, and hypertext links to those Web pages, and may be grouped into a predetermined number of (e.g., ten) search results.

The search engine 220 may submit a request for ads to the ad server 120/210. The request may include a number of ads desired. This number may depend on the search results, the amount of screen or page space occupied by the search results, the size and shape of the ads, etc. In one embodiment, the number of desired ads will be from one to ten, and preferably from three to five. The request for ads may also include the query (as entered or parsed), information based on the query (such as geolocation information, whether the query came from an affiliate and an identifier of such an affiliate, and/or as described below, information related to, and/or derived from, the search query), and/or information associated with, or based on, the search results. Such information may include, for example, identifiers related to the search results (e.g., document identifiers or "docIDs"), scores related to the search results (e.g., information retrieval ("IR") scores such as dot products of feature vectors corresponding to a query and a document, Page Rank scores, and/or combinations of IR scores and Page Rank scores), snippets of text extracted from identified documents (e.g., Web pages), full text of identified documents, topics of identified documents, feature vectors of identified documents, etc.

The search engine 220 may combine the search results with one or more of the advertisements provided by the ad server 120/210. This combined information including the search results and advertisement(s) is then forwarded towards the user that submitted the search, for presentation to the user. Preferably, the search results are maintained as distinct from the ads, so as not to confuse the user between paid advertisements and presumably neutral search results.

The search engine 220 may transmit information about the ad and when, where, and/or how the ad was to be rendered (e.g., position, click-through or not, impression time, impression date, size, conversion or not, etc.) back to the ad server 120/210. As described below, such information may include information for determining on what basis the ad way determined relevant (e.g., strict or relaxed match, or exact, phrase, or broad match, etc.) Alternatively, or in addition, such information may be provided back to the ad server 120/210 by some other means.

Finally, the e-mail server 240 may be thought of, generally, as a content server in which a document served is simply an e-mail. Further, e-mail applications (such as Microsoft Outlook for example) may be used to send and/or receive e-mail. Therefore, an e-mail server 240 or application may be thought of as an ad consumer 130. Thus, e-mails may be thought of as documents, and targeted ads may be served in association with such documents. For example, one or more ads may be served in, under, over, or otherwise in association with an e-mail.

Although the foregoing examples described servers as (i) requesting ads, and (ii) combining them with content, one or both of these operations may be performed by a client device (such as an end user computer for example).

§4.3 EXEMPLARY EMBODIMENTS

FIG. 3 is a flow diagram of an exemplary method 300 for generating and using page-ad information and a page-ad index in a manner consistent with the present invention. Specifically, the method 300 may accept advertiser repository information (e.g., a list of HTML pages) and automatically generate a page-ad and associated ad information for each page using a subset of features of the page. (Blocks 310 and 320) Subsequently, the method 300 may create a page-ad index for all pages from different advertisers (pages violating one or more policies (e.g., pages with sexual explicit material) may be filtered out). (Block 330) As indicated by the upper bracket, blocks 310, 320 and 330 can be considered to be a first phase.

After creating a page-ad index, if a client issues a query (e.g., from a search engine), the method 300 may select candidate page-ads using the page-ads index. If necessary (e.g., if there are more candidate page-ads than requested ads), the candidate page-ads may be entered into an arbitration (e.g., auction). (Block 340) Then, the arbitration may determine a set of one or more winning page-ads to be served for rendering. (Block 350) The method 300 may then be left. (Node 360) As indicated by lower bracket, blocks 340 and 350 can be considered to be a second phase.

Referring back to block 310, the method 300 may accept advertiser repository information. This information may be a copy of the advertiser's inventory in hypertext format of products and/or services offered on their online Website. The inventory could be a collection of pages in HTML, XML, pdf or other "index-able" format. Thus, referring to both blocks 310 and 320, the method 300 may use this inventory to automatically generate an ad creative and associated page-ad information. Such generation of an ad creative and associated page-ad information may be performed for each Web page of the collection that corresponds to a product or service. Thus, the method 300 may automatically generate an ad creative and associated page-ad information for every page obtained from the repository. Alternatively, the advertiser might be able to specify a subset of pages of the Website (e.g., a path portion thereof) for which they want to have ads generated (and/or for which that don't want to have ads generated). For example, consider navigation pages in a Website hierarchy that are not appropriate as a landing page. The advertiser might not want to generate ads for these pages. In at least some embodiments consistent with the present invention, a default operation might be to have ads generated for every page, but the advertiser is given the ability to set a special tag to indicate that an ad should not be generated for a particular page. For example, setting the maximum offer for a page to zero might be used as such an indicator. This is just another way of the advertiser expressing that it is not paying for ads that have this as landing page or that it does not wish to have ads with this as landing page generated.

The ad creative and associated page-ad information may be generated using a subset of features of, or associated with, the pages. These features may include one or more of the following: the amount of money the advertiser is willing to spend on a specific product or category of products, for every page a maximum cost per click (cpc) if the page is the landing page of the page-ad, additional keywords corresponding to this page that the advertiser may not want displayed when the page is rendered using a browser or any other application, etc.

Referring back to block 330, the method 300 may create a page-ad index using information from all the pages from different advertisers. This may be done by generating a first index mapping a page to terms (e.g., words, phrases, and/or n-grams, etc.) extracted from the page. The terms may be weighted. The first index may then be processed to generate an inverted index (referred to as a "page-ad index") mapping terms to pages (or "page-ads" associated with such pages), which may be weighted. Therefore, the page-ad index may contain information about a number of pages (e.g., an associated page-ad identifier) from different advertisers. Indexing hypertext content is a well-known technology to those familiar to the field of search engines. Thus, techniques used to generate indexes and inverted indexes for search engines may be applied in the context of the present invention.

Referring to block 340, when a search query is received, the method 300 may use the page-ads index to determine page-ads corresponding to pages that may include the terms from the search query. Page-ads that include matching keywords or phrases may be considered as candidate page-ads and, if necessary entered into an arbitration (e.g., an auction) to determine a set of one or more winning page-ads. Candidate page-ads may have associated ad information (e.g., max offer per click, estimated click-through rate for the page-ad, budget constraints, etc.). Such parameters may be considered when selecting the winning ads. Although not shown, types of ads other than page-ad may compete with page ads in the arbitration, or in a subsequent arbitration.

Figure 4:
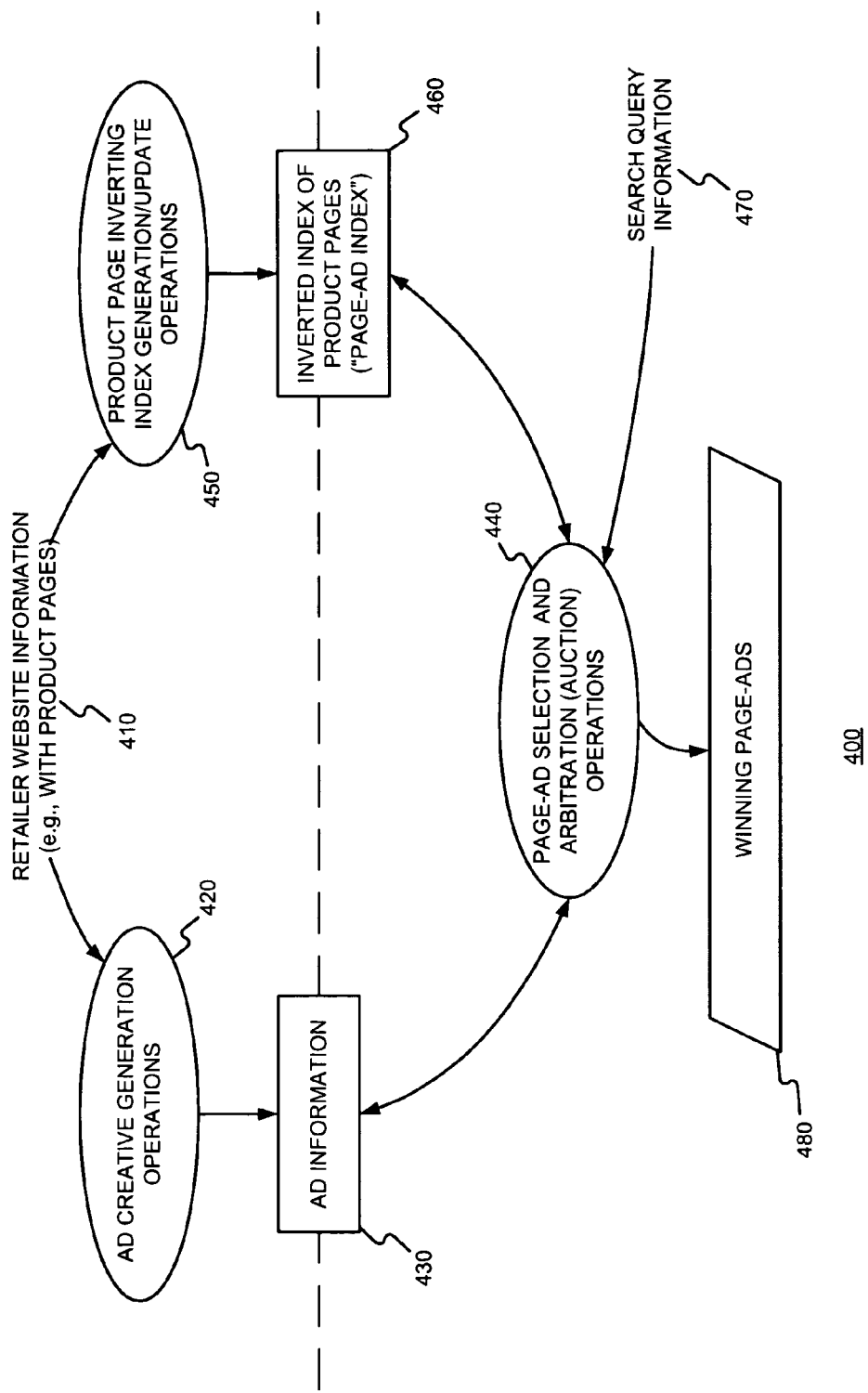
FIG. 4 is a bubble diagram of exemplary operations that may be performed in a manner consistent with the present invention, as well as information that may be used and/or generated by such operations.

FIG. 4 is a bubble diagram of exemplary operations that may be performed in a manner consistent with the present invention, as well as information that may be used and/or generated by such operations. Advertisers can use a system 400 such as the one depicted in FIG. 4 to automatically generate advertisements for their products and/or services, effectively sparing the advertisers from time consuming and laborious work. As shown, the exemplary system 400 of FIG. 4 may include ad creative generation operations 420, product page inverting index generation/update operations 450, and page ad selection and arbitration (auction) operations 440.

Retailer Website information (e.g., with product pages) 410 may be supplied to the ad creative generation operations 420 and the product page inverting index generation/update operations 450. The ad creative generation operations 420 may generate an ad creative (and perhaps other ad information) and save such generated information as ad information 430. The product page inverting index generation/update operations 450 are responsible for generating/updating an inverted index of product pages ("the page-ad index"). The ad information 430 as well as the page-ad index 460 may be accessible to the page-ad selection and arbitration (auction) operations 440. Upon the receipt of an ad request including search query information 470, the page-ad selection and arbitration (auction) operations 440 may use the ad information 430, the page-ad index 460, and the search query information to select winning product page-ads 480 which may be served for rendering.

The retailer (which is the advertiser in this case) may have an online business with a great number of products which would make it tedious and laborious to manually create an ad for each and every product offered. Therefore, using a system such as the one 400 of FIG. 4 for example, the advertiser may simply submit a copy of the repository of the hypertext context (e.g., a list of HTML pages that contain the description of different products), or more generally the Website information 410. The system 400 may then automatically generate a page-ad for every product-based page (or perhaps each selected, or non-excluded, page). In some instances, it may be assumed that the repository is arranged as a hierarchy according to product categories. For instance, all the product pages for digital cameras could be the children of a page that describes digital cameras. This page in turn could be the child of a page corresponding to electronics and so on. In the absence of a hierarchy it may be assumed that all pages are the children of a single parent node which corresponds to a page that describes the advertiser's (online) shop. Note that the Website information 410 (product inventory) may be in the form of a number of "indexable formats" e.g., a collection of pages in HTML, XML, PDF, PPT, DOC, MP3, AVI, FLASH, etc.

The ad creative generation operations 420 are responsible for automatically creating an ad creative for each page (or perhaps each selected, or non-excluded, page) in the repository using a subset of features of the corresponding pages. These features might include, for example, one or more of: (i) the name of the advertiser to which the page belongs; (ii) the name of the specific product or product-category corresponding to the page; (iii) the price range of the underlying product or product category; (iv) the URL corresponding to the landing page; (v) anchor-text that is obtained by looking at pages referring to the advertiser's Webpage; (v) additional text information that the advertiser may provide; etc.

The product page inverting index generation/update operations 450 may accept the retailer Website information 410 (e.g., a repository of product pages) and generate/update an inverted index of product pages 460. For example, the page-ad index 460 may be used to effectively treat (e.g., all) the terms of a page as targeting keywords for an associated page-ad. Selection criteria (e.g., term frequency on the page, term frequency in the collection of all pages, thresholds, meta data, tagged data, title words, terms with larger fonts, terms with bold fonts, etc.) may be used to reduce the number of targeting keywords.

Further, upon receiving a search query request 470, the inverted index of product pages 460 may be used to select candidate page-ads that are associated with pages that have terms that match those of the search query. Using information retrieval ("IR") scores that measure how well the product page correlates with the search query information, as well as historical performance information, the page-ad selection and arbitration operations 450 may calculate an estimated click-through rate for the page-ad. Once candidate pages are obtained, these operations 440 may use certain parameters to determine the winning ads. Examples of such parameters might be a maximum offer per click (and/or some other offer information), the estimated click-through rate (and/or some other measure of ad performance), and budget constraints of the candidate page-ads. The winning page-ads 480 may then be served for rendering. Although not shown, types of ads other than page-ads may compete with page-ads in the arbitration. Alternatively, such other types of ads may compete with winning page-ads in a subsequent arbitration.

§4.3.1 Exemplary Methods

Figure 5:
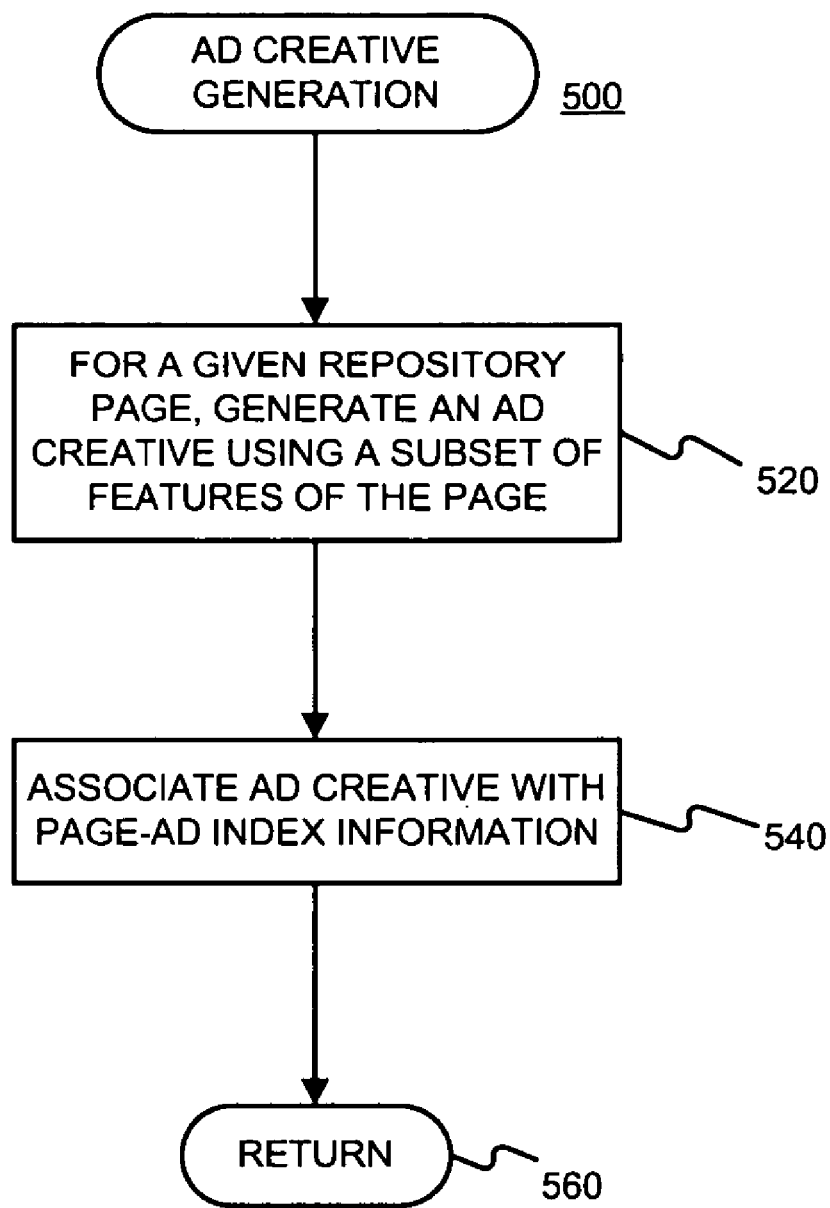
FIG. 5 is a flow diagram of an exemplary method for generating an ad creative in a manner consistent with the present invention.

FIG. 5 is a flow diagram of an exemplary method 500 for performing ad creative generation operations in a manner consistent with the present invention. In particular, for a given repository page, the method 500 may use a subset of features of the page to create an ad creative. (Block 520) Once an ad creative has been created, the method 500 may associate the ad creative (e.g., using a page-ad identifier) with the page-ad index. (Block 540) The method 500 may then be left. (Node 560)

Referring back to block 520, the method 500 may use a certain number of features of a given repository page to automatically create an advertisement without manual intervention. The system may use information/features of a given page such as, for example, one or more of: (a) the name of the advertiser to which the page belongs to; (b) the title of the specific product or product-category corresponding to the page; (c) the price range of the underlying product or product category; (d) the URL corresponding to this page (landing page); (e) anchor-text that is obtained by looking at pages referring to advertiser's websites; (f) additional text information that advertiser may provide; etc. This information may be used by the method 500 to automatically generate an ad creative for a particular page. The advertiser may have selected or defined a particular page-ad template to be populated by information extracted from various pages of its Website.

Further, for a given repository page, more information may be provided. In particular, advertiser may specify (e.g., through the use of tags inserted on the page and/or inserted on a parent or ancestor page of a hierarchy of pages), information such as the amount of money the advertiser is willing to spend for a specific product or category of products to be advertised, a maximum offer-per-click (CPC) for every page-ad for which the page is the landing page, additional keywords corresponding to this page that the advertiser may not want displayed when the page is rendered using a browser or any other application (e.g., Meta data), etc. This additional information may be used in the arbitration operations. As one example, a department store may specify a maximum offer per click of $0.25 for all electronics page-ads, a maximum offer per click of $0.50 for all digital camera page-ads, a maximum offer per click of $0.90 for all HDTV page-ads, a maximum offer per click of $2.25 for a particular plasma HDTV page-ad, etc. The offer information may be formulaic. For example, a department store may specify a maximum offer per click of 1.00% of product price for all electronics page-ads, a maximum offer per click of 3.00% of product price for all HDTV page-ads, etc. The offer might be expressed procedurally (e.g., using rules, algorithms, etc.). The procedure might include one or more formulas, though this is not necessary. In this way, an advertiser can easily specify a price to pay for ads using estimates of conversion rates, profit margins, etc. Notice that the advertiser may be willing to pay a higher percentage of a product price for higher-margin items, and can easily express this desire.

Figure 6:
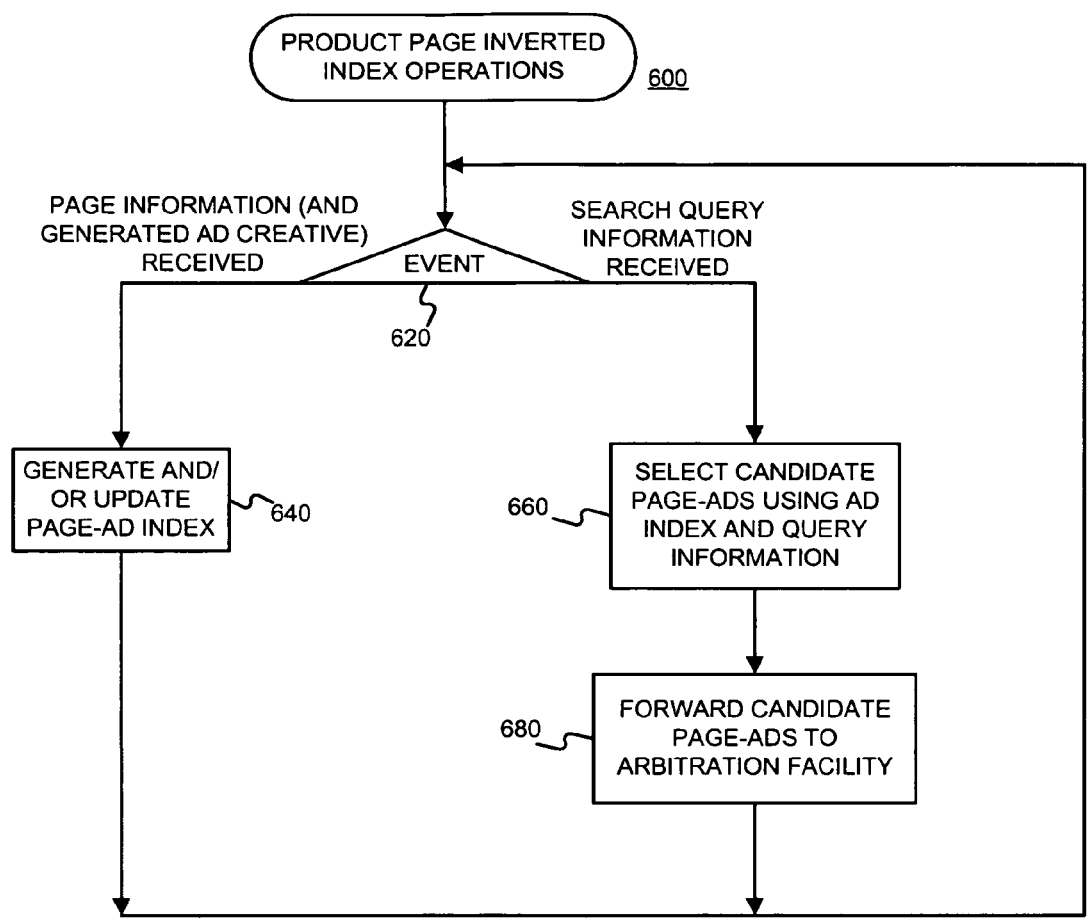
FIG. 6 is flow diagram of an exemplary method for performing page-ad indexing operations in a manner consistent with the present invention.

FIG. 6 is a flow diagram of an exemplary method 600 for performing page-ad indexing operations in a manner consistent with the present invention. As shown, the method 600 may follow different branches based on different events that may occur. (Block 620) If page information (with a generated ad creative) is received, then the method 600 may generate and/or update the page-ads index. (Block 640) If search query information is received, then the method 600 may select candidate page-ads from the page-ad index using the query information. (Block 660) Although not shown, a click-through rate for the ad creative corresponding to the candidate page-ad may be estimated. Subsequently, the method 600 may forward candidate page-ads to an arbitration (e.g., auction) facility. (Block 680)

Referring back to block 640, the method 600 may generate and/or update the page-ad index upon the acceptance of page information with associated page-ad information. Recall that the page-ad index is an inverted index which maps terms to page-ads (either directly using a page-ad identifier, or via a page associated with the page-ad). Hence, the page-ad index is an index of terms which are associated with page-ads (e.g., via associated pages). In essence, the terms of the repository pages are treated as potential targeting keywords for page-ads corresponding to these pages.

Referring back to block 660, when search query information is received, the method 600 may search the ads index to find terms that match terms of the search query. Therefore, based on the matching terms in the page-ad index, the method 600 may select candidate page-ads (either directly, or via associated pages) and perhaps estimate the click-through rate for the corresponding ad creatives. Recall that the page-ad index may weight the pages-ads mapped from the terms, for example to automatically give more weight to terms that were in boldface and/or bigger fonts, and more generally, based on the formatting of the page (e.g., hypertext). Stopwords (e.g., words conveying little meaning such as "a," "the," "for," etc.) may be removed from (or never stored in) the page-ad index. As mentioned earlier, information in the page-ad index may also be used compute an estimated click-through rate for the ad impressions. In particular, when a user issues a query, the ad index may compute a score (e.g., an IR score) that measures how well a given page correlates with the search query. This score, along with the historical performance of the ad impression, could be used to calculate the estimated click-through rate (CTR) for the page-ad's creative.

Figure 7:
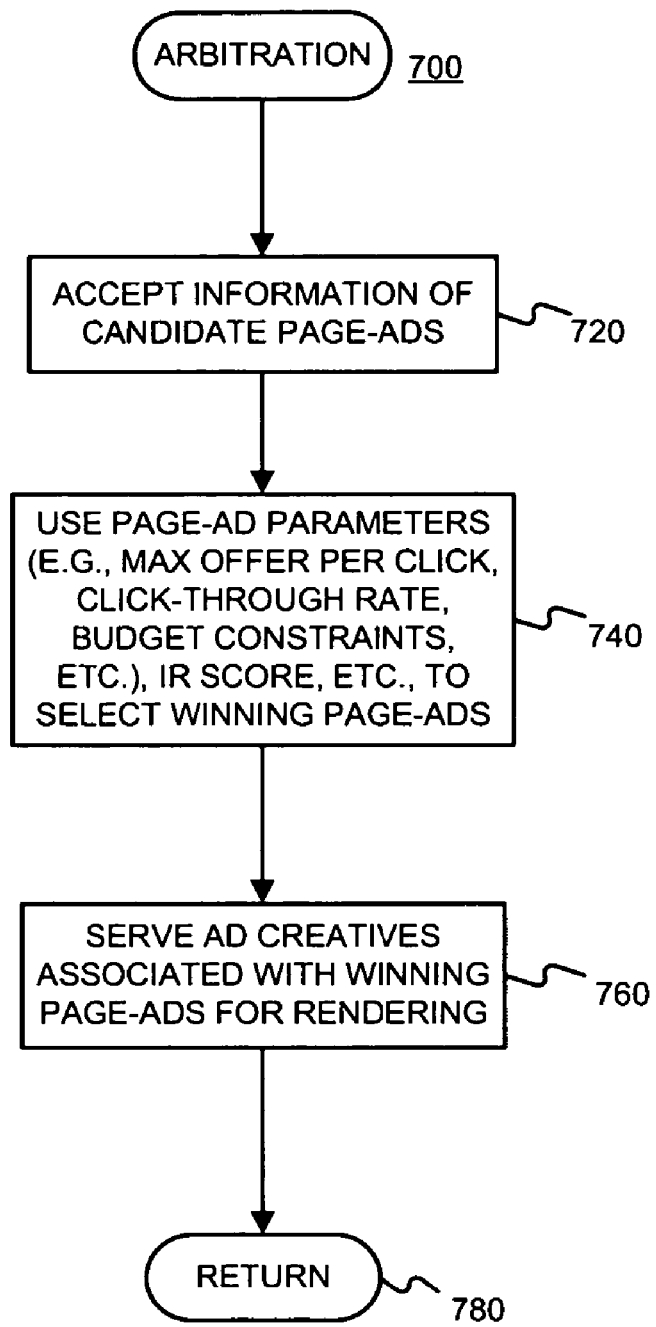
FIG. 7 is a flow diagram of an exemplary method for performing arbitration operations in a manner consistent with the present invention.

FIG. 7 is a flow diagram of an exemplary method for performing arbitration operations in a manner consistent with the present invention. In particular, the method 700 may accept candidate page-ads and subsequently use parameters associated with each of the candidate page-ads (e.g., maximum offers per click, estimated click-through rate, budget constraints, etc.) to select winning page-ads. (Blocks 720 and 740) Then, the method 700 may serve the winning ad(s) for rendering, (Block 760) before the method 700 is left (Node 780). Although not shown, types of ads besides page-ads may compete in the arbitration. Alternatively, such other types of ads can compete with winning page-ads in a subsequent arbitration.

§4.3.2 Exemplary Apparatus

Figure 8:
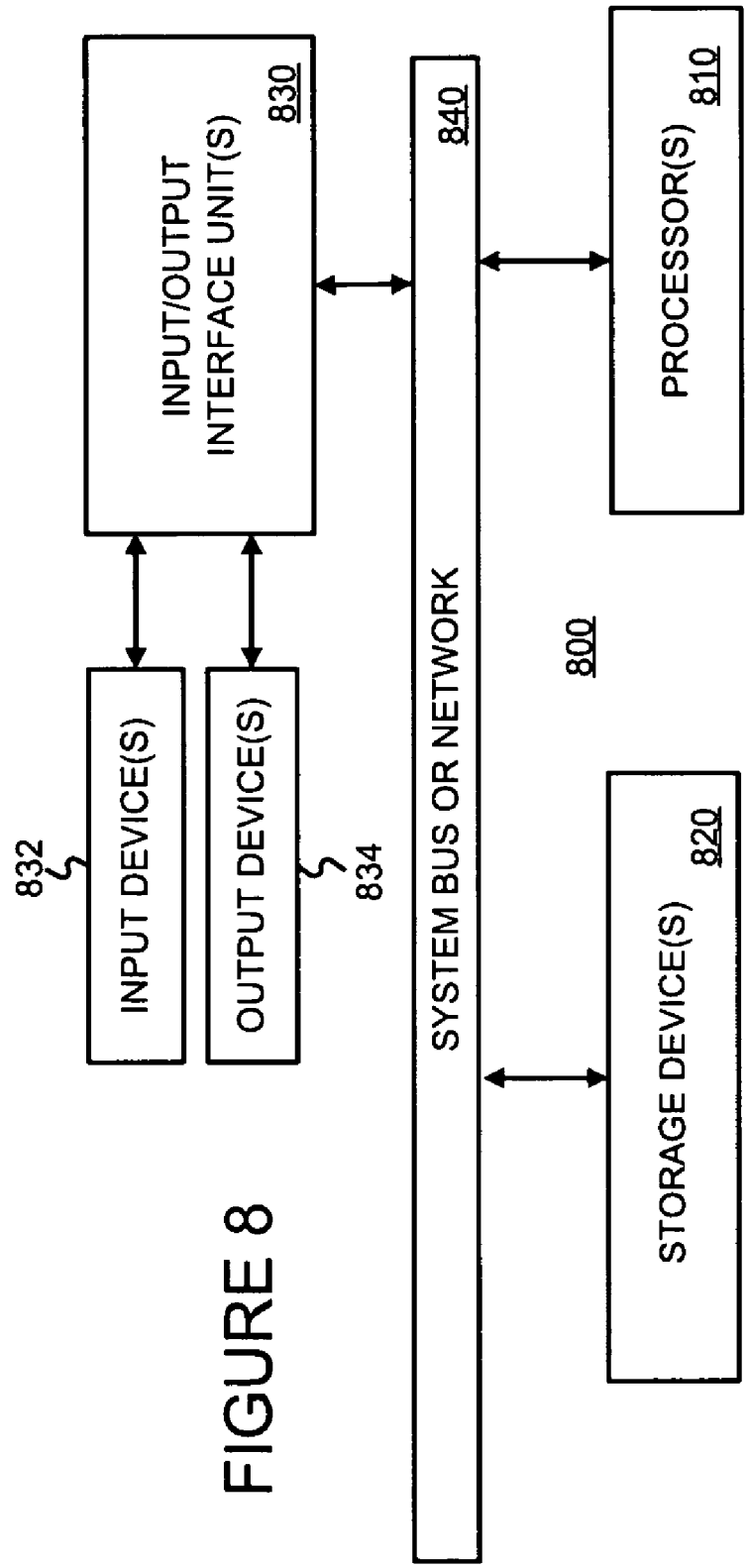
FIG. 8 is a block diagram of an exemplary apparatus that may perform various operations and store various information in a manner consistent with the present invention.

FIG. 8 is high-level block diagram of a machine 800 that may perform one or more of the operations and store various information described above. The machine 800 basically includes one or more processors 810, one or more input/output interface units 830, one or more storage devices 820, and one or more system buses and/or networks 840 for facilitating the communication of information among the coupled elements. One or more input devices 832 and one or more output devices 834 may be coupled with the one or more input/output interfaces 830.

The one or more processors 810 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present invention. At least a portion of the machine executable instructions may be stored (temporarily or more permanently) on the one or more storage devices 820 and/or may be received from an external source via one or more input interface units 830.

In one embodiment, the machine 800 may be one or more conventional personal computers. In this case, the processing units 810 may be one or more microprocessors. The bus 840 may include a system bus. The storage devices 820 may include system memory, such as read only memory (ROM) and/or random access memory (RAM). The storage devices 820 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 832, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 810 through an appropriate interface 830 coupled to the system bus 840. The output devices 834 may include a monitor or other type of display device, which may also be connected to the system bus 840 via an appropriate interface. In addition to (or instead of) the monitor, the personal computer may include other (peripheral) output devices (not shown), such as speakers and printers for example.

Referring back to FIG. 2, one or more machines 800 may be used as end user client devices 250, content servers 230, search engines 220, e-mail (or v-mail) servers 240, and/or ad servers 210.

§4.3.3 Refinements, Alternatives and Extensions

In at least some embodiments consistent with the present invention, the click-through rates used in an arbitration may be simply ad creative click-through rates, unadjusted for IR score. Naturally, other information may be used in an arbitration instead of, or in addition to, selection rates. Such information may include one or more of other measures of ad performance, various offers or maximum offers for various user actions, etc. In at least some embodiments consistent with the present invention, a page-ad's score may correspond to an estimated revenue per page-ad impression.

As mentioned above, the page-ad index need not index all the words of the repository product-based pages. Recall that stopwords may be removed. The index may be limited to certain types of terms, such as only terms included in a product title, only terms provided with more conspicuous fonts (e.g., 12 point, bold face font terms included, 8 point font terms filtered out), terms having a certain minimum (relative or absolute) frequency of on the page, or inverse frequency across pages of a collection, etc.

The inverted-index may simply map terms to pages or page identifiers (rather than to page-ads). A separate mapping may be used to map the pages (identifiers) to associated page-ads. The term "page-ad index" is intended to cover both of these alternatives.

Although many of the examples described above concerned product pages and associated ads for products, embodiments consistent with the present invention may also be applied to pages and ads for services.

In the case of a Website with a hierarchy of products, offer information may be applied at different levels of the hierarchy. In some embodiments consistent with the present invention, offer information associated with the most specific and relevant level of the hierarchy is used. For example, suppose that a parent node digital camera page has an maximum offer of $0.20 per selection, a first child node page A has a maximum offer of $0.35 per selection, and a second child node page B has no offer information. A page-ad associated with page A would have a maximum offer of $0.35 per selection while a page-ad, associated with page B would have a maximum offer of $0.20 per selection (inherited from parent node). In at least some embodiments consistent with the present invention, offer information associated with the ad is a function of the offer information associated with all pages in the hierarchy (path from the given node to the root) of the page for which this ad is created. An example of such a function is one that takes the offer information that is available at the closest or most specific ancestor of the node.

The term "products" is to be interpreted to include anything that can be bought and sold. Thus, products may include consumable items (such as restaurant menu items for example), property items (such as real estate listings for example), living items (such as livestock for example), temporary items (e.g., a song play, a pay-per-view event), etc.

§4.4 EXAMPLE OF OPERATIONS IN AN EXEMPLARY EMBODIMENT CONSISTENT WITH THE PRESENT INVENTION

Figure 9:
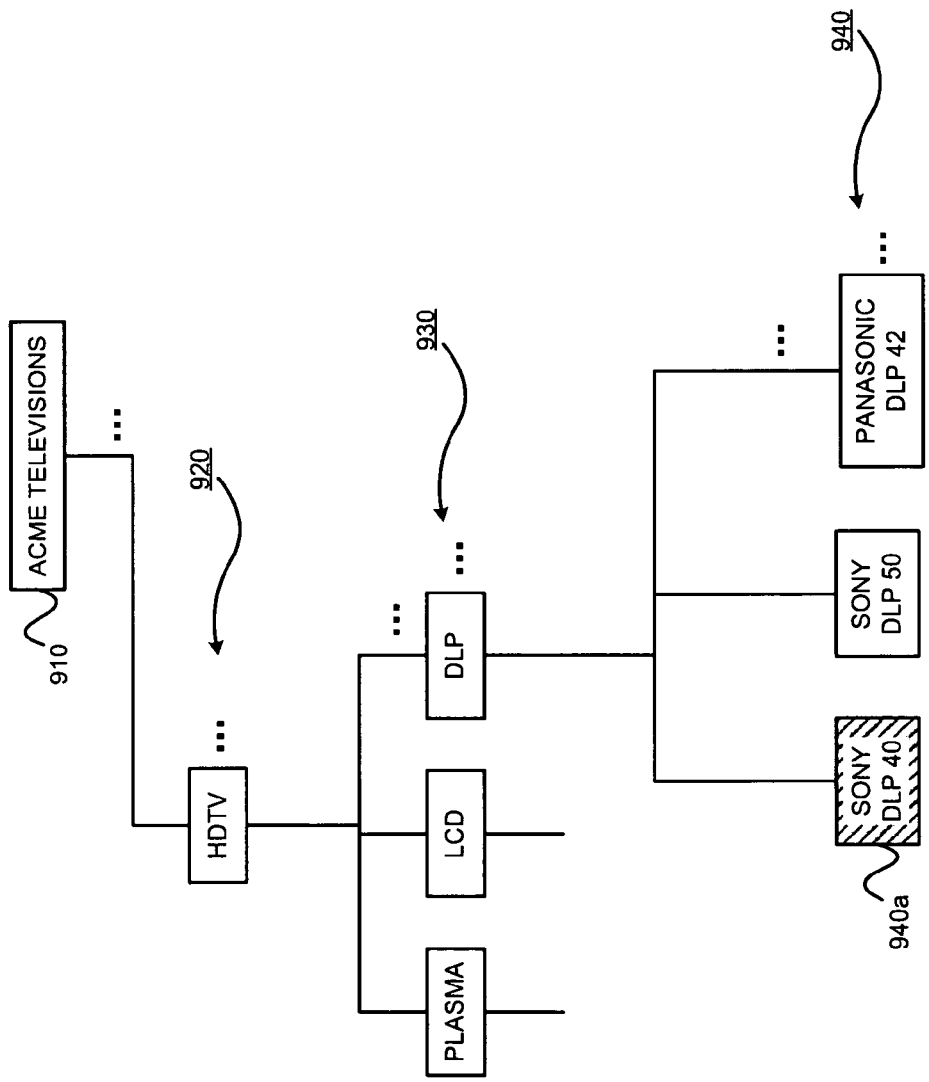
FIG. 9 illustrates a hierarchical navigation scheme of an illustrative Website.

FIG. 9 illustrates a hierarchical navigation scheme of an illustrative Website 900. The home page 910 includes a number of category pages 920, one of which is an HDTV category page. Assume that the merchant associated a maximum offer per click of $2.00 with the HDTV category page. Assume that the HDTV category page has a number of sub-category pages—plasma, LCD and DPL—930. Assume that the merchant associated a maximum offer per click of $3.00 with the plasma category page, no offer information with the LCD category page, and a maximum offer per selection of $2.50 with the DLP category page. Finally, assume that the DLP sub-category page includes a number of product pages 940, one of which 940a is a product page for a Sony DLP 40" TV.

Figure 10:
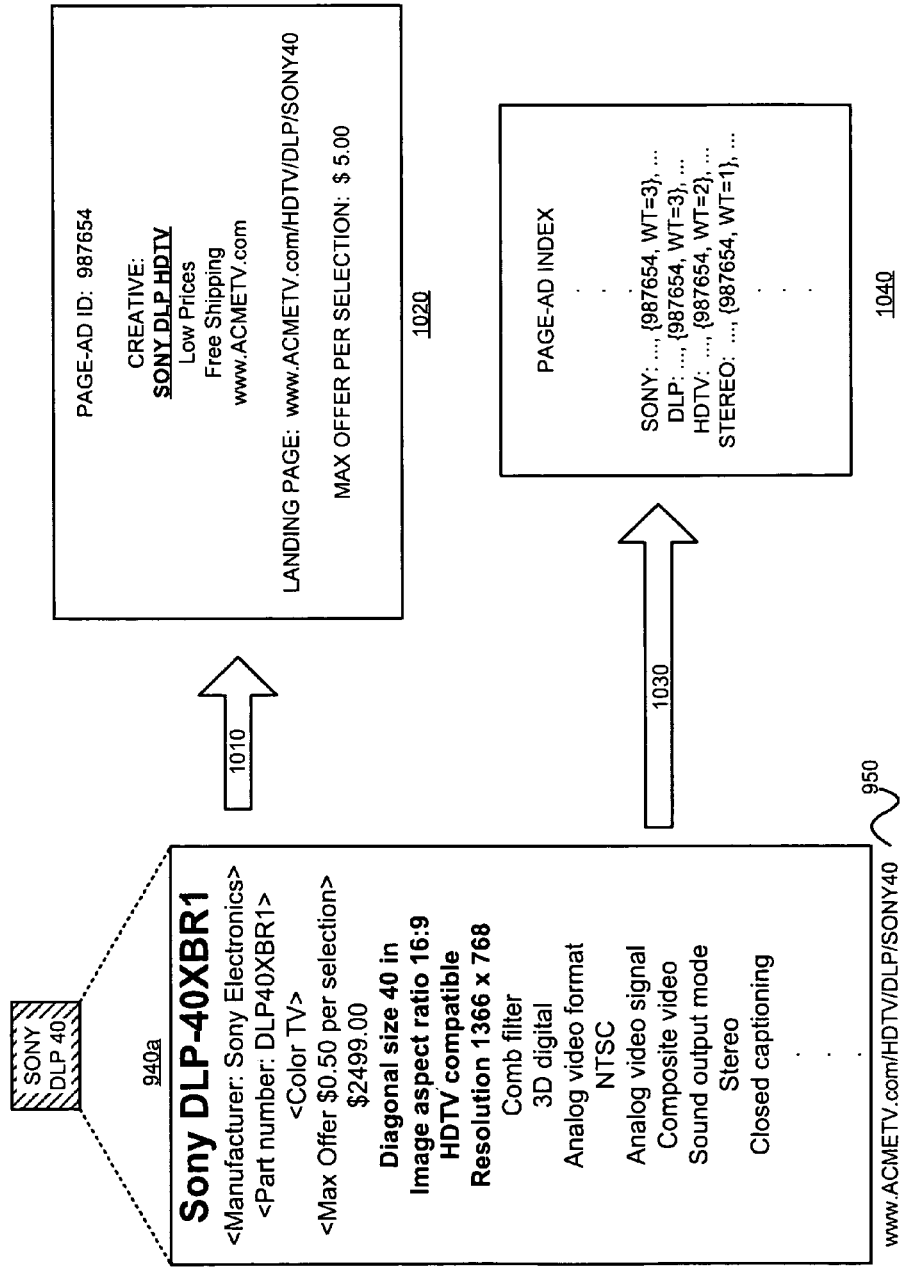
FIG. 10 is an example illustrating operations in an exemplary embodiment consistent with the present invention.

FIG. 10 is an example illustrating operations in an exemplary embodiment consistent with the present invention. The product page 940a may include title (e.g., product name) information, meta information depicted within <brackets>, various product specification information, and product price information (e.g., $2499.00). A page-ad generation process, illustrated abstractly as arrow 1010, may be used to generate page-ad information 1020. As shown, the page-ad information 1020 may include an identifier, creative information, landing page information (which may correspond to the address (e.g., URL) of the original product page 940a) and offer information. As also shown, page-ad index generation operations, illustrated abstractly as arrow 1030, may be used to generate/update a page-ad index 1040. Notice that the index 1040 includes various terms, some of which are found in pages corresponding to the identified page ad 1020. Furthermore, weights may be provided (e.g., 3 for a title term, 2 for a bold term, and 1 otherwise).

As can be appreciated from the foregoing, if the search query "sony DLP HDTV" were entered, the page-ad index would include some matches to the ad 1020. Accordingly the ad 1020 might be considered to be a candidate ad. If there were too many candidate ads, an arbitration operation (not shown) could score the ad 1020 using one or more of an IR score, its offer information (which is a maximum offer of $5.00 per selection (note that this is more than that of the parent DLP sub-category page)), ad performance information (not shown), etc. and sort or rank the candidate ads using their scores.

§4.5 CONCLUSIONS

As can be appreciated from the foregoing, the present invention may be used to automatically generate advertisements for product-based and/or service-based WebPages (i.e., HTML, XML, etc). These advertisements may be automatically targeted using an inverted index which effectively uses terms found on the page as targeting keywords.

What is claimed is:

1. A computer-implemented method comprising:
a) accepting, for each of at least one advertiser, by an advertising system including one or more computers, information from at least one advertiser document, wherein the at least one advertiser document defines an inventory of at least one of products and services offered on an online Website of the at least one advertiser;
b) generating ads for the at least one advertiser, by the advertising system, each of the generated ads including
i) a creative, and
ii) offer information, using the accepted information from the at least one advertiser document;

c) generating, by the advertising system, an index mapping information extracted from the at least one advertiser document to one of (A) advertiser document identifiers for the at least one advertiser document on which the extracted information is found, and (B) ad identifiers for ads generated from the at least one advertiser document on which the extracted information is found;

d) accepting, by the advertising system, additional information, wherein the additional information is one of (A) search query information and (B) document relevance information;

e) determining, by the advertising system, one or more ads relevant to the additional information using the index generated and the additional information; and f) serving at least one of the determined one or more relevant ads for rendering on a client device, wherein the offer information is expressed procedurally.

2. The computer-implemented method of claim 1, wherein the at least one advertiser document is a product Web page.

3. The computer-implemented method of claim 1, wherein the at least one advertiser document is a product Web page of an e-commerce Website.

4. The computer-implemented method of claim 1, wherein the at least one advertiser document is a service Web page.

5. The computer-implemented method of claim 1, wherein the offer information is one of (A) an offer per ad impression, (B) a maximum offer per ad impression, (C) an offer per ad selection, (D) a maximum offer per ad selection, (E) an offer per ad conversion and (F) a maximum offer per ad conversion.

6. The computer-implemented method of claim 1, wherein the offer information is expressed in terms of a set currency.

7. The computer-implemented method of claim 1, wherein the offer information is expressed formulaically, and wherein the formula includes a product price extracted from the at least one advertiser document.

8. The computer-implemented method of claim 1, wherein the at least one advertiser document includes a unique online address,
    wherein each of the generated ads is associated with a specified landing page to be loaded upon ad selection, and
    wherein the specified landing page is set to the unique online address of the at least one advertiser document from which the ad was generated.

9. The computer-implemented method of claim 1, wherein the at least one advertiser document is a Web page including a URL address,
    wherein each ad further includes a specified landing page to be loaded upon ad selection, and
    wherein the specified landing page is set to the URL address of the Web page from which the ad was generated.

10. The computer-implemented method of claim 1, wherein each of the ad creatives is generated using accepted text from the at least one advertiser document by selecting only some of the accepted text using at least one of (A) font size, (B) font attributes, and (C) Meta information.

11. The computer-implemented method of claim 1, wherein, in the index generated, the one of (A) advertiser document identifiers for the at least one advertiser document on which the extracted information is found, and (B) ad identifiers for ads generated from the at least one advertiser document on which the extracted information is found, includes weights.

12. The computer-implemented method of claim 11, wherein the information from the at least one advertiser document includes terms, each of the terms including one of a word and a phrase,
    wherein the index generated maps terms extracted from the at least one advertiser document back to one of (A) advertiser document identifiers for the at least one advertiser document on which the extracted terms are found, and (B) ad identifiers for ads generated from the at least one advertiser document on which such terms are found, and
    wherein the weights are determined as a function of at least one of (A) font size, (B) font attributes, and (C) Meta information, of the terms in the at least one advertiser document.

13. The computer-implemented method of claim 1, wherein the at least one advertiser document is a product Web page of an e-commerce Website, which Web page is arranged in a hierarchy defined by product categories.

14. The computer-implemented method of claim 13, wherein at least some of the information for a particular product Web page is inherited from an ancestor Web page.

15. The computer-implemented method of claim 13, wherein offer information for an ad associated with a particular product Web page is inherited from an ancestor Web page.

16. The computer-implemented method of claim 1, wherein the information from the at least one advertiser document includes terms, each of the terms including one of a word and a phrase,
    wherein the index generated maps the terms extracted from the at least one advertiser document back to one of (A) advertiser document identifiers for the at least one advertiser document on which such terms are found, and (B) ad identifiers for ads generated from the at least one advertiser document on which such terms are found such that the terms are used as targeting keywords,
    wherein the at least one advertiser document is a plurality of product Web pages of an e-commerce Website, which Web pages are arranged in a hierarchy defined by product categories, and
    wherein at least one of the terms is inherited from an ancestor Web page.

17. The computer-implemented method of claim 1, wherein the act of finding one or more relevant ads using the index generated and the search query information includes using terms of the search query to lookup at least one of (A) advertiser document identifiers for the at least one advertiser document on which such terms are found, and (B) ad identifiers for ads generated from the at least one advertiser document on which such terms are found.

18. The computer-implemented method of claim 1, further comprising:

g) determining a set of one or more ads using the one or more ads determined to be relevant to the additional information, as candidate ads by
    scoring the candidate ads, and
    accepting a subset of the candidate ads based on their scores.

19. The computer-implemented method of claim 18 wherein the act of scoring candidate ads uses offer information associated with the ads.

20. The computer-implemented method of claim 18 wherein the act of scoring candidate ads uses performance information associated with the ads.

21. The computer-implemented method of claim 18 wherein the act of scoring candidate ads uses a degree of relevance associated with the ads.

22. The computer-implemented method of claim 18 wherein the act of scoring candidate ads uses information on other pages in the hierarchy of the page for which this ad was created.

23. The computer-implemented method of claim 1 wherein the offer information is expressed procedurally using an embedded set of instructions.

24. The computer-implemented method of claim 1, further comprising:
   g) generating, by the advertising system, another index mapping one of (A) advertiser document identifiers and (B) ad identifiers for ads generated from the at least one advertiser document, to information extracted from the at least one advertiser document.

25. Apparatus comprising:
   a) at least one processor;
   b) an input device; and
   c) at least one storage device storing a computer executable code which, when executed by the at least one processor, performs a method of
      1) accepting, for each of at least one advertiser, information from at least one advertiser document, wherein the at least one advertiser document defines an inventory of at least one of products and services offered on an online Website of the at least one advertiser,
      2) generating ads for the at least one advertiser, each of the generated ads including
         i) a creative, and
         ii) offer information,
      using the accepted information from the at least one advertiser document,
      3) generating an index mapping information extracted from the at least one advertiser document to one of (A) advertiser document identifiers for the at least one advertiser document on which the extracted information is found, and (B) ad identifiers for ads generated from the at least one advertiser document on which the extracted information is found,
      4) accepting additional information, wherein the additional information is one of (A) search query information and (B) document relevance information;
      5) determining one or more ads relevant to the additional information using the index generated and the additional information, and
      6) serving at least one of the determined one or more relevant ads for rendering on a client device,
   wherein the offer information is expressed procedurally.

26. The apparatus claim 25 wherein the offer information is expressed procedurally using an embedded set of instructions.

* * * * *